US009815359B2

(12) United States Patent
Morazan

(10) Patent No.: US 9,815,359 B2
(45) Date of Patent: Nov. 14, 2017

(54) AUTOMATED VEHICLE SUNSHADE

(71) Applicant: Harold Morazan, San Tan Valley, AZ (US)

(72) Inventor: Harold Morazan, San Tan Valley, AZ (US)

( * ) Notice: Subject to any disclaimer, the term of this patent is extended or adjusted under 35 U.S.C. 154(b) by 0 days.

(21) Appl. No.: 15/092,502

(22) Filed: Apr. 6, 2016

(65) Prior Publication Data

US 2016/0288635 A1    Oct. 6, 2016

Related U.S. Application Data

(60) Provisional application No. 62/143,645, filed on Apr. 6, 2015.

(51) Int. Cl.
*E04H 15/06* (2006.01)
*B60J 11/04* (2006.01)
*E04H 15/32* (2006.01)

(52) U.S. Cl.
CPC .............. *B60J 11/04* (2013.01); *E04H 15/06* (2013.01); *E04H 15/322* (2013.01)

(58) Field of Classification Search
CPC ......... E04H 15/58; E04H 15/06; E04H 15/48; E04H 15/322; B60J 1/00; B60J 11/00; B60J 7/20; B60J 11/02
USPC ........... 135/88.07, 88.1, 88.16, 96, 117, 119; 296/97.2, 97.6, 136.01, 136.11–136.12, 296/163
See application file for complete search history.

(56) References Cited

U.S. PATENT DOCUMENTS

| | | | | |
|---|---|---|---|---|
| 1,999,171 A * | 4/1935 | Bryant | ..................... | B60J 11/02 150/166 |
| 4,216,989 A * | 8/1980 | Tackett | ..................... | B60J 11/00 150/166 |
| 5,795,012 A * | 8/1998 | Liou | ........................ | B60J 11/00 135/16 |
| 5,921,259 A * | 7/1999 | Ehler | ..................... | A45B 11/00 135/119 |
| 6,782,904 B2 * | 8/2004 | Tien | ......................... | B60J 11/00 135/88.01 |
| 6,916,043 B2 * | 7/2005 | Rhea | ........................ | B60J 11/06 280/770 |
| 6,935,674 B1 * | 8/2005 | Campos | ................... | B60J 11/00 296/136.1 |
| 7,137,661 B2 * | 11/2006 | Neuer | .................... | B60J 11/025 160/370.22 |
| 7,562,928 B1 * | 7/2009 | Morazan | ................ | B60J 11/00 296/136.01 |

(Continued)

*Primary Examiner* — Winnie Yip
(74) *Attorney, Agent, or Firm* — Schmeiser, Olsen & Watts LLP

(57) ABSTRACT

An automated vehicle sunshade includes a compartment mountable to a roof of a vehicle, a flexible shade, a plurality of rods coupled to the flexible shade and a drive device coupled to the plurality of rods and a spindle coupled to the flexible shade and operable by the drive device. The plurality of rods are retractable and extendable so that the sunshade repeatably alternates between an extended position and a retracted position. In the retracted position, the flexible shade, plurality of rods and drive device are enclosed within the compartment. The sunshade also rotates the spindle by operation of the drive device to allow the shade to extend and retract without snagging, tearing and to easily fit within the compartment.

7 Claims, 8 Drawing Sheets

(56) References Cited

U.S. PATENT DOCUMENTS

| | | | |
|---|---|---|---|
| 8,651,555 B2 * | 2/2014 | Chan | B60J 11/04 150/166 |
| 9,352,642 B2 * | 5/2016 | Fogarty | B60J 11/04 |
| 2004/0135393 A1 * | 7/2004 | Neuer | B60J 7/165 296/136.1 |
| 2014/0366922 A1 * | 12/2014 | King | E04H 15/58 135/96 |

* cited by examiner

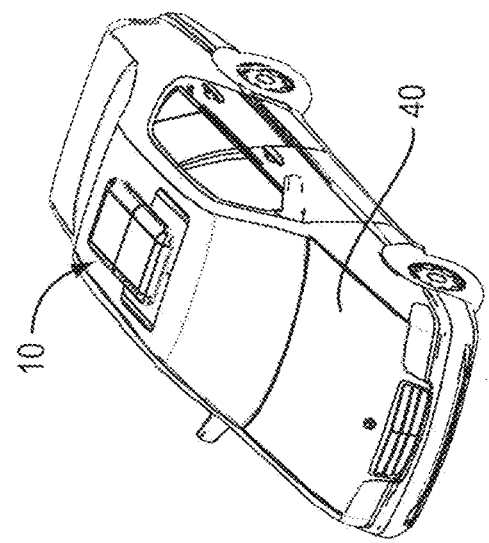
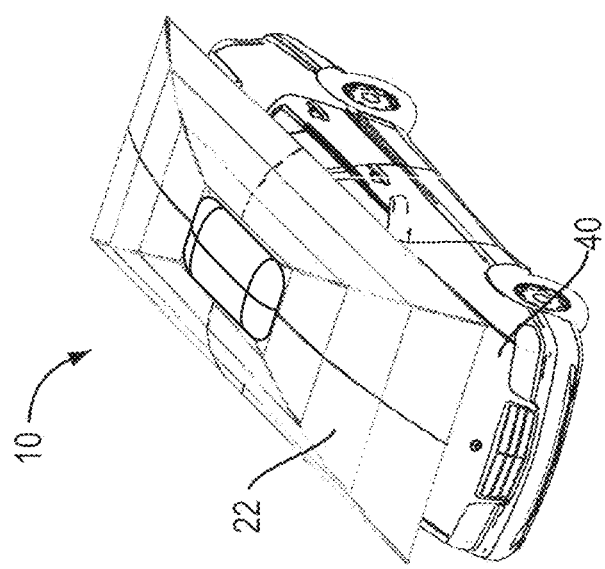
FIG. 1A
FIG. 1B

AUTOMATED VEHICLE SUNSHADE

CROSS REFERENCE TO RELATED APPLICATION[S]

This application claims priority to U.S. Provisional Patent Application entitled "AUTOMATED VEHICLE SUNSHADE," Ser. No. 62/143,645, filed Apr. 6, 2015, the disclosure of which is hereby incorporated entirely herein by reference.

BACKGROUND OF THE INVENTION

1. Technical Field

This invention relates generally to a vehicle sunshade and more particularly to an automated vehicle sunshade that is formed of a photovoltaic material.

2. State of the Art

Vehicles are driven to various places that people need to go and are often parked in a parking lot that is open and exposed to the elements of nature. The weather conditions often affect the vehicles parked in these types of parking lots. One type of weather condition that is of particular concern is a sunny, hot day. With the temperature being hot and a vehicle exposed to the sun for extended periods of time, the rays of the sun enter the vehicle through the windows and the vehicle becomes hotter than the ambient temperature outside of the vehicle. This often causes great discomfort for people who must then enter the vehicle and in some instances can even cause harm such as burning of the person within the car.

This concern is greater in regional locations where the temperature is consistently hot for a substantial period of time. In these types of locations, people often tint their vehicle windows and/or use conventional sunshades in an attempt to block or deflect at least a portion of the sun rays entering the vehicle. While shade serves to provide a much cooler vehicle, the conventional sunshades have several limitations.

Conventional sunshades are typically made for use on the windshield. This allows the owner of the vehicle to block a portion of the sun from entering the car, but cannot block the sun from entering all of the windows of the vehicle. Often, the owner will park in such a direction that most of the sun will be blocked during the time the vehicle is parked in that particular location.

Further, other typical sunshades may be used to block the sun from portions of other windows by use of sunshades with suction cups to retain them on the window. These often fall and do not cover the entire window, thereby exposing the inside of the vehicle to the sun. Additionally, as the type of vehicle changes, the need for different types of sunshades is required to account for the varying types of windows on the vehicle.

Conventional sunshades are limited to only providing shade to the inner portion of the vehicle and do not protect the outer vehicle parts from exposure to the sun. For example, and not as a limitation, vehicle doors and door handles are often formed of a type of metal. The metal exposed to the sun often heats to a degree that it is hot to the touch causing difficulty to the person attempting to open the hot door who must grasp the hot handle. Further still, the vehicle engine is hot and starting can result in inefficient starting and consumption of greater fuel.

Due to the limitations of conventional sunshades, owners often use other means to block the sun from certain vehicle parts. For example, and without limitation, a steering wheel cover is used to protect the steering wheel and provide a material that does not heat as easily, a towel or other cover is used to cover parts such as a seat belt buckle, a car seat and even leather or vinyl seats.

Additionally, while the sun is often a problem in warmer climates, colder climates have other needs with their vehicle windows. For example, in climates were there is snow, conventional methods of removing snow from a window of a vehicle include the use of a brush to brush the windows free from snow. Additionally, in cold climates, ice forms on the windshield and other vehicle windows. An ice scrapper is often utilized to free the window from ice.

Accordingly, there is a need in the field of vehicle sunshades for an improved vehicle sunshade.

DISCLOSURE OF THE INVENTION

The present invention relates to an automated vehicle sunshade that provides shade to all windows of a vehicle independent of the sun location and further provides shade to portions of the vehicle exterior. The automated vehicle sunshade is formed of photovoltaic material so that sunlight incident on the automated vehicle sunshade creates electrical charge which can be harvested, stored, and used.

An aspect of the present invention includes an automated vehicle sunshade comprising a compartment mountable to a roof of a vehicle, a flexible shade, retractable, extendable rods coupled to the flexible shade and extendable to extend the shade over the vehicle and retractable to bring the shade within the compartment, a spindle coupled to the shade for winding the shade when it is retracting and unwinding the shade when it is extending, and a drive device for driving the retractable extendable rods and rotating the spindle, wherein the compartment retains the shade, the retractable extendable rods, the spindle and the drive device within the compartment when the shade is retracted.

The vehicle sunshade may further comprise, in other aspects of the present invention, a remote control for remotely activating the sunshade. The automated sunshade may further comprise a sensor that activates the drive device if certain weather conditions are sensed or if the sunshade is being tampered with.

The foregoing and other features and advantages of the present invention will be apparent from the following more detailed description of the particular embodiments of the invention, as illustrated in the accompanying drawings.

BRIEF DESCRIPTION OF THE DRAWINGS

FIG. 1A is a perspective view of an automated sunshade mounted on a vehicle in a closed position;

FIG. 1B is a perspective view of an automated sunshade mounted on a vehicle in an opened position;

DETAILED DESCRIPTION OF EMBODIMENTS OF THE INVENTION

Figure 2A:
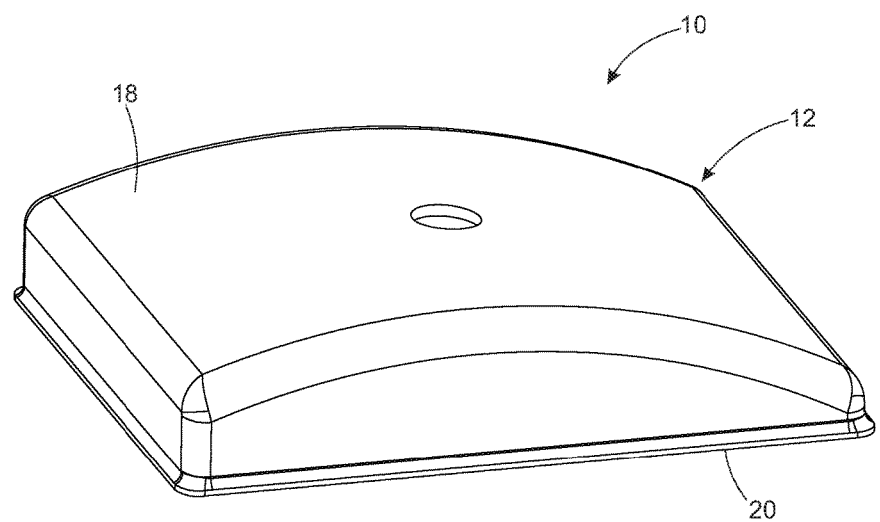
FIG. 2A is a perspective view of an automated sunshade in a closed position.
Figure 2B:
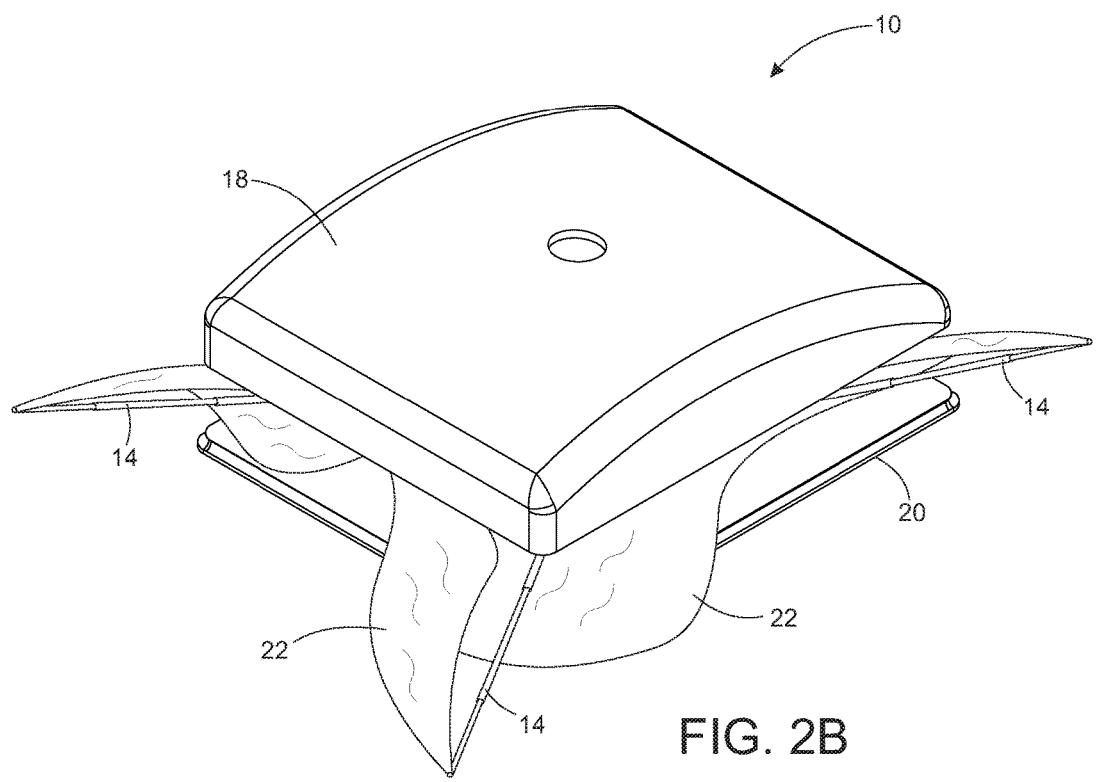
FIG. 2B is a perspective view of an automated sunshade in a partially opened position.
Figure 2C:
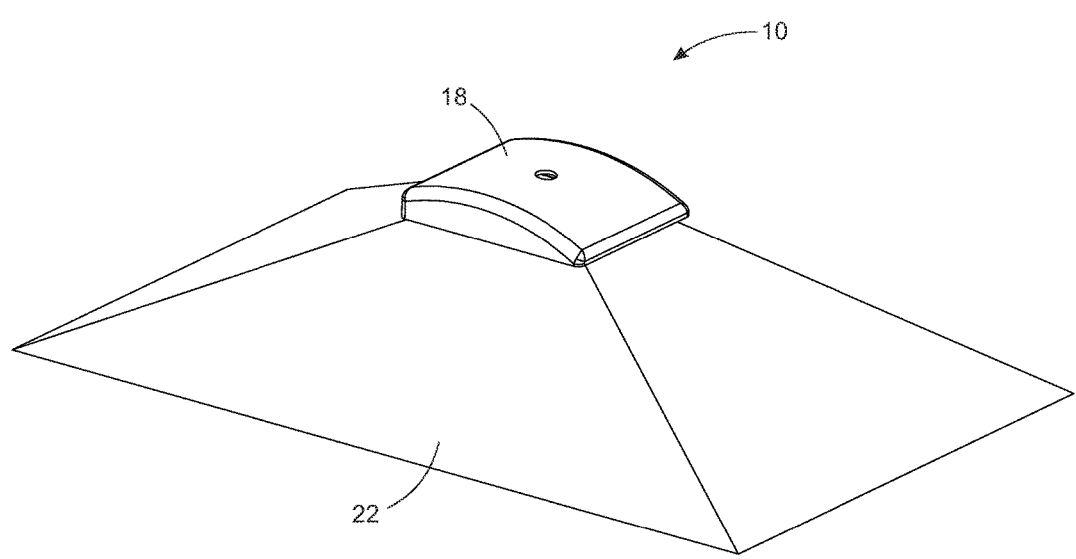
FIG. 2C is a perspective view of an automated sunshade in an opened position.
Figure 3A:
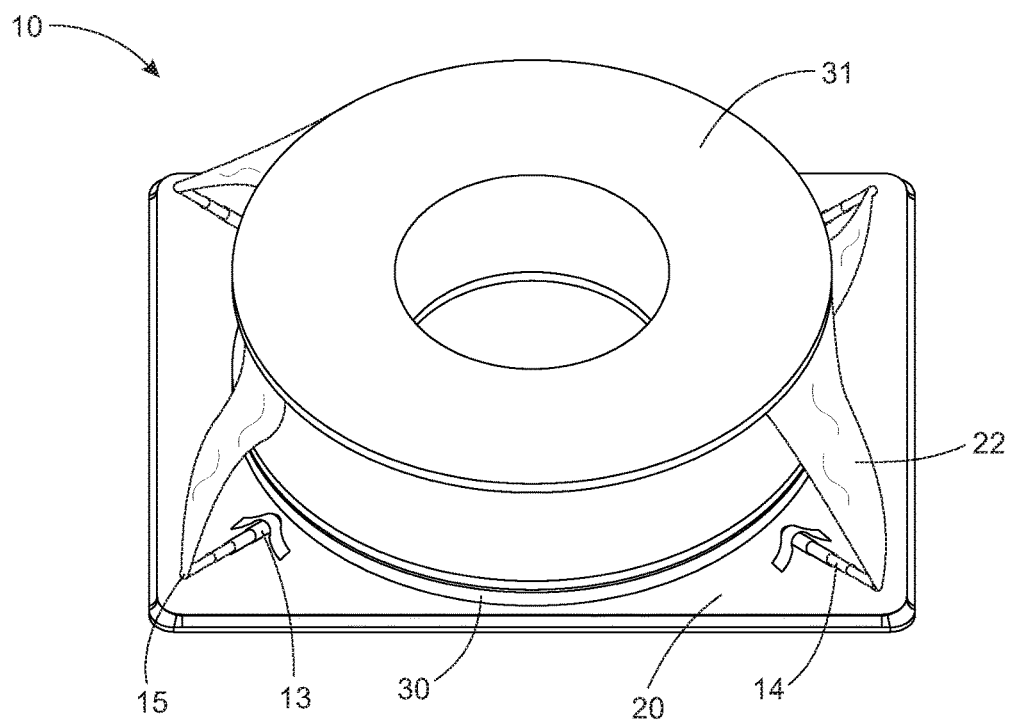
FIG. 3A is a perspective view of a portion of an automated sunshade in an extended position.
Figure 3B:
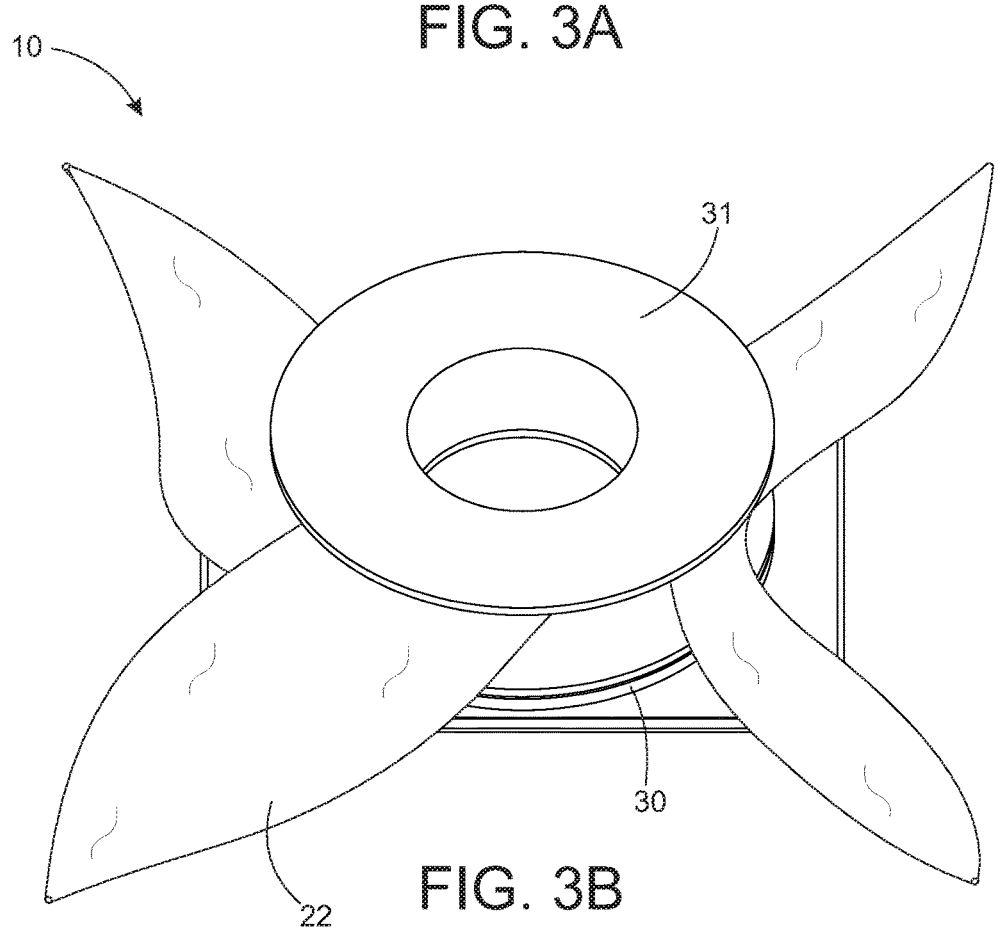
FIG. 3B is a perspective view of a portion of an automated sunshade in a partially opened position.
Figure 3C:
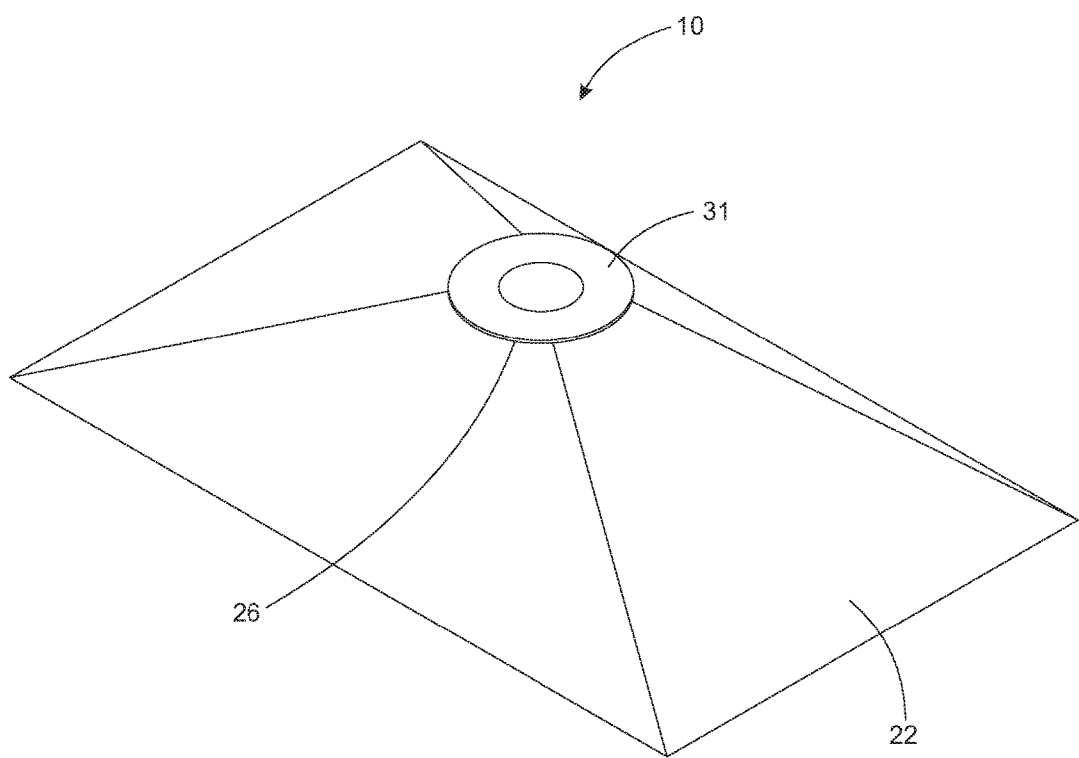
FIG. 3C is a perspective view of a portion of an automated sunshade in an extended position.

As discussed above, embodiments of the present invention relate to an automated vehicle sunshade that provides shade to all windows of a vehicle independent of the sun location and further provides shade to portions of the vehicle exterior.

As shown in FIGS. 1A-1B, 2A-2C and 3A-3C, particular embodiments of the present invention include an automated vehicle sunshade 10. The sunshade 10 comprises a compartment 12, retractable extendable rods 14, a shade 22 and a drive device 30. The a plurality of retractable extendable rods 14 comprise a first end 13 and a second end 15 and may be telescopically extendable and retractable between an extended and a retracted position. The rods 14 may further have a predetermined curvature, such that when in the extended position, the second end 15 of the rods 14 extends below the first end 13 of the rods 14, or in other embodiments, the rods may be flexible and allow gravity to act on the second end 15 of the rods 14 to allow the rods to bend slightly for the second end 15 to be in a position below the first end of the rods 14. Each retractable extendable rod 14 may be coupled at one end to the drive device 30 and at the other end to a portion of the shade 22.

It will be understood by those of ordinary skill in the art, that the curvature of the rods 14 is not limited in the amount of curvature. So long as the rods 14 may be retracted within the compartment 12, the curvature of the rods 14 is proper. Further still, it will be understood that the present invention is not limited to rods, but may use other types of devices to support the shade, such as, but not limited to hinged members such as metal, fiberglass and the like in a zigzag configuration. Additionally, the plurality of retractable extendable rods may be 2, 3, 4, 5, 6 or more.

The shade 22 may be coupled to the retractable extendable rods 14. For the exemplary purposes of this disclosure and not as a limitation, the shade 22 may be a frusto-pyramidal shape. The corners 24 of the shade 22 may be coupled to the second ends 15 of the retractable extendable rods 14. A center portion 26 of the shade 22 may be coupled to a spindle 31 of a drive device 30 coupled within the compartment 12 (see FIG. 3C). The drive device 30 may operate to retract the rods 14 substantially contemporaneously. Further, the drive device 30 may include components that time the extension and the retraction of the rods 14 with the rotation of the spindle 31, wherein as the rods 14 pull in the corners of the shade 22, the spindle 31 rotates to gather the shade 22 and any slack therein around the spindle 31. Further, as the rods 14 extend and pull the corners out of the compartment 12, the spindle 31 rotates to unwind the shade 22 to extend to an opened position.

The shade 22 may be formed of a flexible, durable material that may easily be wound to a size that fits within the compartment 12. Further, particular embodiments of the present invention may include a shade that has apertures extending through portions of the shade to allow air and wind to pass through, thereby allowing the shade 22 to remain open in a certain amount of wind without causing damage to the sunshade 10.

In operation, the automated sunshade 10 may be opened into an extended position. The compartment 12 may further comprise comprising a cover 18 and a base 20. When the sunshade 10 is activated, the cover 18 extends in a direction away from the base 20 to provide sufficient space for the rods 14 and the shade 22 to extend from within the compartment 12.

The drive device 30 may be activated, wherein the drive device 30 extends the retractable extendable rods 14. As the rods 14 extend, the drive device 30 also unwinds the shade 22 from around spindle 31 allowing the rods 14 to pull the shade 22 into the extended position. Once the rods 14 are fully extended, the drive device 30 is automatically deactivated and the shade 22 remains in the extended position. When in the extended position, the shade 22 may provide shade for not only all of the windows, but may also provide shade for a portion of the vehicle, including, but not limited to potions of the door, door handles, a portion of the hood, a portion of the trunk and the roof. This enables a user of the sunshade 10 to protect himself or herself from some injuries from touching hot metal when opening the vehicle door, and further provides shade to the hood and roof of the car to further limit the amount of heat transfer into the vehicle.

When shade is no longer desired over the vehicle, the sunshade 10 may be retracted. The drive device 30 may then be activated again. The drive device 30 now begins to retract the rods 14 and rotate the spindle 31 substantially contemporaneously. The retraction of the rods 14 in coordination with the rotation of the spindle 31 provide proper winding of the shade 22 such that the shade is wound onto spindle 31 to fit within the compartment 12. Once the rods 14 and shade 22 are fully retracted, the drive device 30 further operates to move the cover 18 toward the base 20 of the compartment 12 to enclose the drive device 30, the spindle 31, the rods, and the shade 22 within compartment 12. Once the cover 18 is in contact with the base 20 of the compartment 12, the drive device 30 may automatically deactivate.

It will be understood that particular embodiments of the present invention may include a vehicle shade device wherein a length of the flexible shade is greater than a length of the vehicle and a width of the flexible shade is greater than a width of the vehicle.

Other particular embodiments of the present invention include an automated sunshade that further comprises a remote control. The remote control may provide for remotely activating the drive device and thereby extending and/or retracting the shade. In particular embodiments, the sunshade may be electrically coupled to an alarm system of the vehicle, such that when the alarm system is set, the sunshade may be extended and when the alarm system is deactivated, the sunshade is retracted. Additionally, the sunshade may further comprise a weather sensor wherein during certain types of weather, the sensor will determine the weather type and activate the drive device to retract the shade. For example, the sensor may be a wind sensor wherein the rate of travel of wind is measured by the sensor and the sunshade automatically retracts when the rate of travel of wind is higher than a predetermined rate to protect the sunshade from wind damage. Also, the sensor may be a thermometer, wherein if the ambient temperature drops below a predetermined temperature, the sunshade automatically retracts or deploys dependant on user input. The sensor according to embodiments of the present invention may be utilized with a controller that activates a motor of the drive device. In these particular embodiments, the controller may comprise a memory wherein the predetermined weather factors are stored and referenced by the controller to determine if retraction of the shade is required.

Further still, other particular embodiments of the present invention may provide for various types of power sources. For example, and without limitation, the power source may be supplied by the battery of the vehicle, wherein a power inverter may be utilized to provide the proper power to activate the drive device. Power of the battery would only be drawn upon during activation of the drive device. Another example, without limitation, may be an independent power source, such as a battery.

Figure 4:
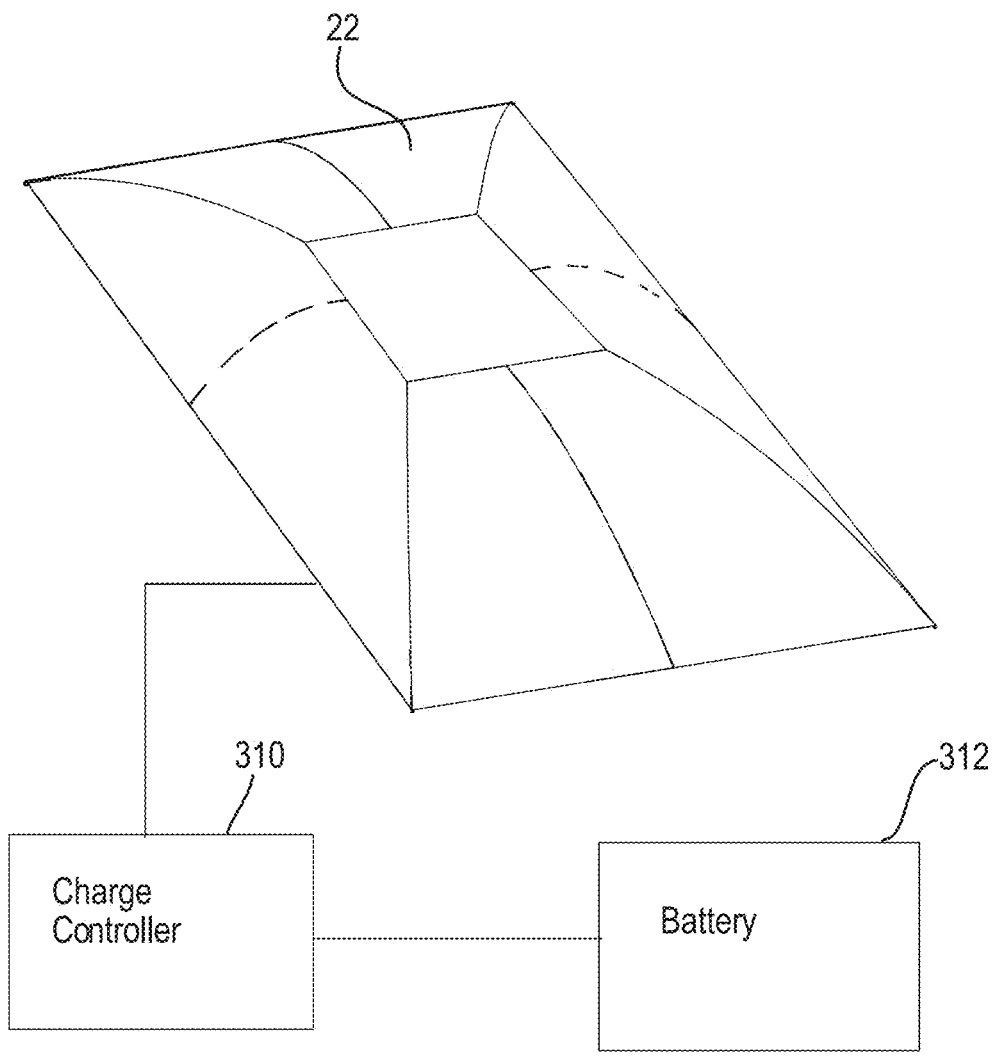
FIG. 4 is a block diagram of an automated sunshade formed of photovoltaic material electrically coupled to a charge controller and a battery.
Figure 5:
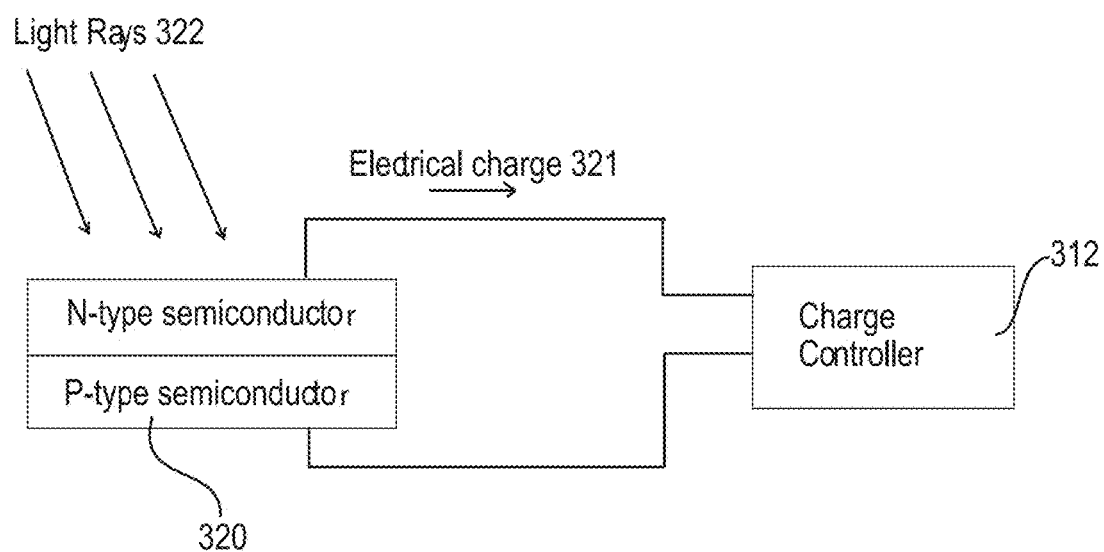
FIG. 5 illustrates how photovoltaic material creates electrical charge when hit by light rays. The charge controller collects the electrical charge.

In one embodiment of the invention shown in FIG. 4, automated vehicle sunshade 22 is formed of photovoltaic material. A photovoltaic material converts light rays 322 into electrical charge, as shown in FIG. 5. Light rays 322 can be sunlight, but are no limited in this aspect. FIG. 5 shows photovoltaic material 320. Photovoltaic material 320 generates electrical charge or current 321, when sunlight is incident on photovoltaic material 320. In this embodiment electrical charge 321 is harvested and stored in battery 312. Automated vehicle sunshade 22 is meant to block sunlight. Converting the sunlight incident on automated vehicle sunshade 22 into electrical charge 321 and storing electrical charge 321 is one way to put the incident sunlight to good use. Automated vehicle sunshade 22 consists in this embodiment of one or more than one panel of photovoltaic material 320. A panel of photovoltaic material 320 is also known as a solar cell, a solar collector, or a photovoltaic panel.

FIG. 4 shows automated vehicle sunshade 22 electrically coupled to charge controller 310 and battery 312. In this embodiment the flexible material that automated sunshade 22 is formed of is photovoltaic material 320. In some embodiments one or more than one panels of photovoltaic material 320 are attached to the flexible material that forms automated vehicle sunshade 22. In the embodiment shown in FIG. 4 the photovoltaic material is silicon, which can be in the form of crystalline silicon, polycrystalline silicon, or amorphous silicon. In some embodiments the photovoltaic material is cadmium telluride. In some embodiments the photovoltaic material is a solar ink or a solar dye or a conductive plastic. The photovoltaic material in automated sunshade 22 can be any material that converts optical radiation into electrical charge.

Sunlight incident on automated vehicle sunshade 22 is converted into electrical charge 321 in response to the light rays 322 hitting photovoltaic material 320 comprised in automated vehicle sunshade 22. Electrical charge 321 is collected and regulated by charge controller 310. A charge controller is also known in the art as a charge regulator. Charge controller 310 collects electrical charge or current 321, created by photovoltaic material 320 and converts it into voltage or current. The voltage created by the automated vehicle sunshade 22 in this embodiment is between 6 and 40 volts, but the invention is not limited to these voltage levels. Automated vehicle sunshade 22 and charge controller 310 can convert electrical charge 321 into any voltage or current level. This voltage can vary in other embodiments depending on how many individual panels of photovoltaic material 320 are used and how they are electrically connected. Photovoltaic panels used in the invention can be electrically connected in parallel to increase current or in series to increase voltage or in series/parallel to increase both current and voltage. In this embodiment the 6 to 40 volts created is regulated by charge controller 310 and sent to battery 312 for storage. Battery 312 can be a car battery. Battery 312 can be a battery used solely for powering automated vehicle sunshade 22. Battery 312 can be a battery that is used to collect charge 321 from automated vehicle sunshade 22 and when full, is removed and replaced with a new battery to be charged. Battery 312 can be any battery used for any purpose. In some embodiments the charge 321 collected from automated vehicle sunshade 22 is stored in a different form of energy storage device, such as a fuel cell.

In some embodiments battery 312 that is used to store electrical charge 321 generated by automated vehicle sunshade 22 is the battery that powers the vehicle that automated vehicle sunshade 22 is mounted to. In this embodiment automated vehicle sunshade 22 will recharge battery 312 while the vehicle is parked. In some embodiments the vehicle is an electric vehicle. Automated vehicle sunshade 22 can be used to re-charge the vehicle's battery 312 when an electrical outlet is not available.

Figure 6:
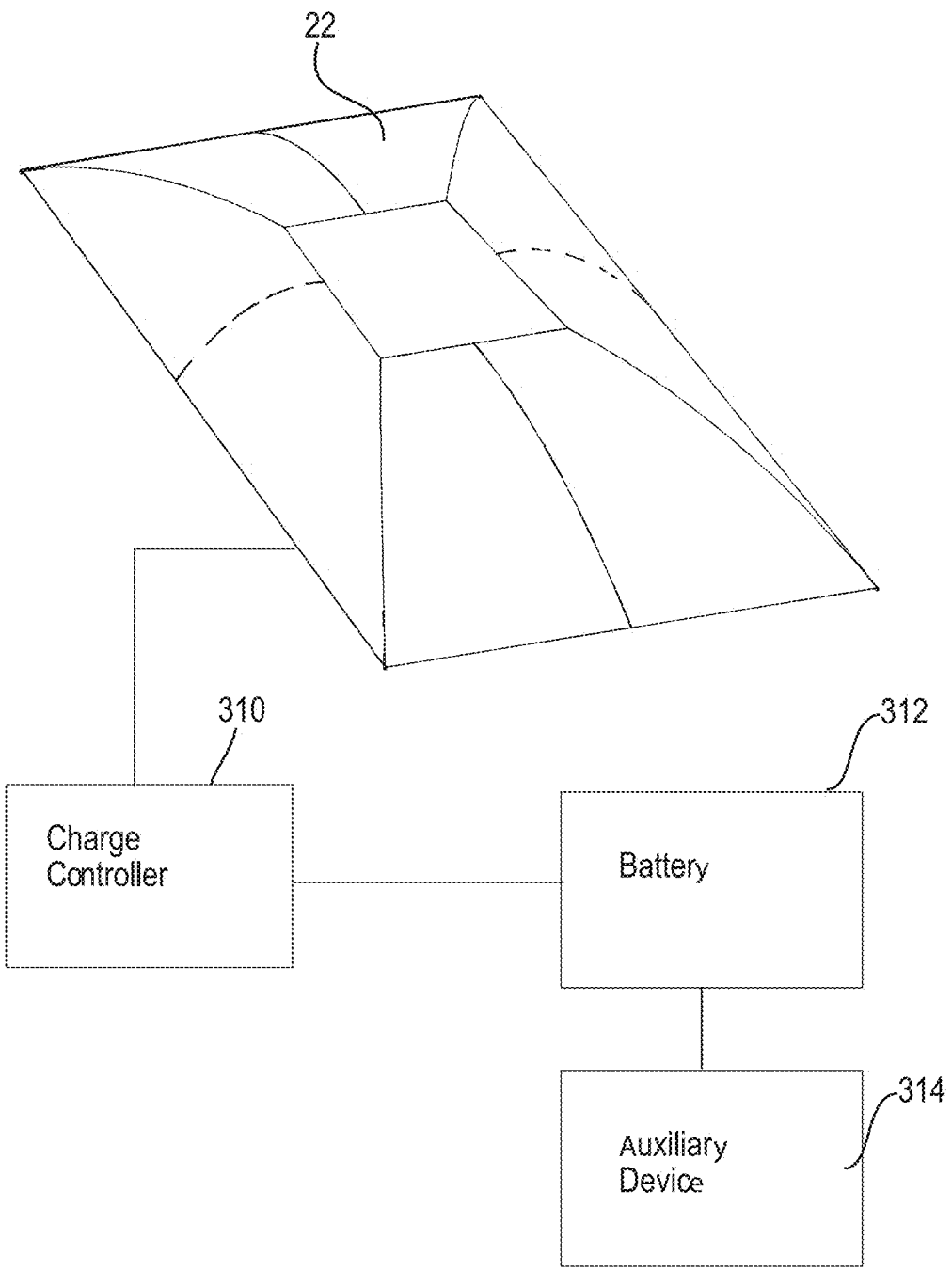
FIG. 6 is a block diagram showing automated sunshade made of photovoltaic material, a charge controller, a battery, and an auxiliary device. The auxiliary device can be powered by the battery, which is charged by the automated sunshade made of photovoltaic material, and the charge controller.

Electrical charge 321 generated by automated vehicle sunshade 22, collected by charge controller 310, and stored in battery 312 can be used for many purposes. In some embodiments battery 312 can power auxiliary devices 314. FIG. 6 shows auxiliary device 314 coupled to battery 312 such that battery 312 provides power for auxiliary device 314. Auxiliary device 314 can be many different types of devices. In some embodiments auxiliary device 314 is a block heater. Block heaters are used in cold climates to keep engine blocks warm when the temperatures are so low that starting an engine becomes difficult to impossible because of the low temperature of both the engine and the battery. The problem is that powering the block heater while the vehicle is off requires additional energy from the already-stressed battery unless an external power source is available. In this embodiment the electrical charge generated by automated vehicle sunshade 22 can be used to power the block heater. The heated block will require less power from the battery when started, and the block heater has not used battery resources to keep the block warm, but has instead used power generated by automated vehicle sunshade 22. Automated vehicle sunshade will be deployed and generated electrical charge while the vehicle is parked, which is when the block heater is needed.

In some embodiments the electrical charge generated by automated vehicle sunshade 22 can be used to power portable devices such as cellphones, laptops, or GPS units. In a particular embodiment automated vehicle sunshade 22 includes a remote cellphone antenna. In this embodiment the electrical charge generated by automated vehicle sunshade 22 can be used to boost the sending and receiving power of the cellphone, increasing the service coverage area of the phone.

It is to be understood that numerous embodiments of automated vehicle sunshade 22 formed of a photovoltaic material are possible. Electrical components and interconnects different from that shown in FIG. 4, FIG. 5, and FIG. 6 are envisioned as part of the invention. Further, while some embodiments are shown with the vehicle sunshade 22 being gathered when in the retracted position, it will be understood that some embodiments may include rolling the material on a spring loaded roller, wherein the drive device 30 operates to roll and unroll the sunshade 22 in a similar manner as other spring-loaded rolling apparatuses, such as, but not limited to, an automated awning.

Further, a method of using a vehicle sunshade 22 may comprise the steps of coupling a flexible shade to a vehicle, wherein the flexible shade comprises photovoltaic material; moving the flexible shade from a retracted position to an extended position, wherein sunlight hits the photovoltaic material; creating an electrical charge in response to the sunlight hitting the photovoltaic material; collecting and regulating the electrical charge in response to operation of a charge controller operatively connected with the flexible shade; and storing the electrical charge in a battery operatively connected to the charge controller. Further, the method may comprise the step of providing power to an auxiliary device operatively coupled to the battery.

It will be understood that various ways of mounting an automated vehicle sunshade may be utilized without departing from the scope of this disclosure. For example, and without limitation, the mounting may include devices such as, magnets, straps, clamps, tie downs, clips, fasteners, bolts, adhesives, hook-and-loop fasteners, and any combinations thereof. The sunshade may be mounted on parts of a vehicle including, but not limited to a roof and a roof rack. Further, the sunshade may be permanently mounted on the vehicle, removably mounted on the vehicle or integral to the vehicle. In instances where the sunshade is integral to the vehicle, the compartment may be mechanically extended from the roof of the vehicle before activating the drive device.

For example, an integral vehicle sunshade may be provided as a vehicle upgrade, similar to a sunroof. The sunshade may not be readily distinguishable as a sunshade and provides a streamline aesthetic appearance.

Particular embodiments of the present invention may include an automated sunshade that is provided in various colors, shades, and surface treatments, so as to compliment the aesthetic qualities of the vehicle the sunshade is mounted to. Additionally, the shade portion of the sunshade may be of a complimentary color and/or may be of a highly reflective material and color.

It will be understood by those of ordinary skill in the art that while the present invention includes an automated vehicle sunshade, the sunshade may be manually operated. For example, if there is a type of malfunction of the motor, the power source and/or the like, the sunshade may still be retractable and extendable without a power source. It will also be understood that the automated vehicle shade may be utilized to shade areas around the vehicle depending on the placement of the sunshade on the vehicle. This enables shade to be provided near the vehicle for uses, such as, but not limited to, tailgate parties, road side concessions, parade viewing and the like. Additionally, written indicia may be placed on the shade material, such as advertisements, team sports, custom graphics and the like.

It will be understood that particular embodiments of the present invention may be used in other types of weather conditions, such as, but not limited to snow and other cold weather. For example, the automated vehicle sunshade may be used to shield the windows of a vehicle from retaining snow on the windows, thereby requiring no need for brushing of the snow away from the windows with a snow brush. Additionally, cold weather is often accompanied with ice formation on windows and often in door locks. Embodiments of the present invention may be used to shield the car, similar to a covering over a parking spot and prevent ice from forming on the windows and the within the key lock, thereby requiring no scraping of ice with an ice scraper nor requiring the deicing of the lock. It will be understood that the shade may be utilized to warm the vehicle, including the windows to melt ice.

Accordingly, the components defining any embodiment of an automated vehicle sunshade may be formed of any of many different types of materials or combinations thereof that can readily be formed into shaped objects provided that the components selected are consistent with the intended operation of an automated vehicle sunshade. For example, the components may be formed of: rubbers (synthetic and/or natural) and/or other like materials; glasses (such as fiberglass) carbon-fiber, aramid-fiber, any combination thereof, and/or other like materials; polymers such as thermoplastics (such as acrylonitrile butadiene styrene (ABS), fluoropolymers, polyacetal, polyamide; polycarbonate, polyethylene, polysulfone, and/or the like), thermosets (such as Epoxy, Phenolic Resin, Polyimide, Polyurethane, Silicone, and/or the like), any combination thereof, and/or other like materials; composites and/or other like materials; metals, such as zinc, magnesium, titanium, copper, iron, steel, carbon steel, alloy steel, tool steel, stainless steel, aluminum, any combination thereof, and/or other like materials; alloys, such as aluminum alloy, titanium alloy, magnesium alloy, copper alloy, any combination thereof, and/or other like materials; any other suitable material; and/or any combination thereof.

Furthermore, the components defining any embodiment of an automated vehicle sunshade may be purchased pre-manufactured or manufactured separately and then assembled together. Manufacture of these components separately or simultaneously may involve extrusion, pultrusion, vacuum forming, injection molding, blow molding, resin transfer molding, casting, forging, cold rolling, milling, drilling, reaming, turning, grinding, stamping, cutting, bending, welding, soldering, hardening, riveting, punching, plating, and/or the like. If any of the components are manufactured separately, they may then be coupled with one another in any manner, such as with adhesive, a weld, a fastener (e.g. a bolt, a nut, a screw, a nail, a rivet, a pin, and/or the like), wiring, any combination thereof, and/or the like for example, depending on, among other considerations, the particular material forming the components. Other possible steps might include sand blasting, polishing, powder coating, The embodiments and examples set forth herein were presented in order to best explain the present invention and its practical application and to thereby enable those of ordinary skill in the art to make and use the invention. However, those of ordinary skill in the art will recognize that the foregoing description and examples have been presented for the purposes of illustration and example only. The description as set forth is not intended to be exhaustive or to limit the invention to the precise form disclosed. Many modifications and variations are possible in light of the teachings above without departing from the spirit and scope of the forthcoming claims. For example, the shape of the sunshade is not limited to a frusto-pyramidal shape, but may be any shape such as, but not limited to a dome, a pyramid, and the like, so long as the sunshade provides the proper shade over the windows and portions of the car in accordance with the present invention. Further, the sunshade may be of various sizes for various sizes of vehicles, or alternatively, the sunshade may be one size that is universal for all or substantially all vehicle sizes.

The invention claimed is:

1. An automated vehicle sunshade comprising:
a compartment mountable to a roof of a vehicle;
a flexible shade;
retractable, extendable rods coupled to a portion of the flexible shade and extendable to extend the shade over the vehicle and retractable to bring the shade within the compartment, wherein the shade is extended above a surface of the vehicle; and a spindle of a drive device coupled to the shade for winding the shade when it is retracting and unwinding the shade when it is extending, wherein the drive device is coupled to the retractable extendable rods for driving the retractable extendable rods and rotating the spindle, wherein the compartment retains the shade, the retractable extendable rods, the spindle and the drive device within the compartment when the shade is retracted.

2. The vehicle sunshade of claim 1, further comprising a remote control for remotely activating the sunshade.

3. The vehicle sunshade of claim 1, further comprising a sensor that activates the drive device if certain weather conditions are sensed.

4. The vehicle sunshade of claim 1, further comprising a sensor that activates the drive device to retract the sunshade when extended if the sunshade is being tampered with.

5. The vehicle sunshade of claim 1, wherein the shade is a frusto-pyramidal shape.

6. The vehicle sunshade of claim 1, wherein the shade has at least one aperture.

7. The vehicle sunshade of claim 1, wherein extension and retraction of the retractable extendable rods are timed with rotation of the spindle.

* * * * *